Oct. 30, 1956     M. J. HILER     2,768,913
CIGARETTE FILTER TIPS FROM DEXTRAN
Filed Oct. 22, 1954
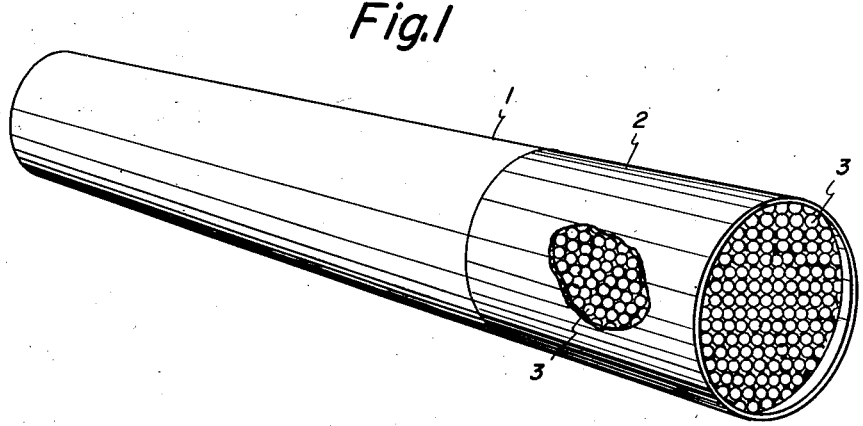
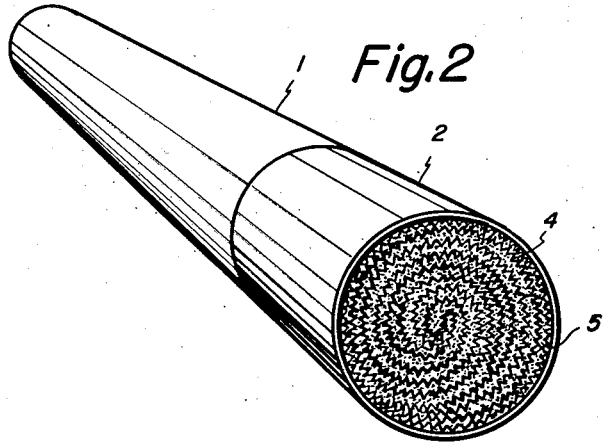
INVENTOR.
MALVERN J. HILER
BY
Attorneys

United States Patent Office 2,768,913
Patented Oct. 30, 1956

2,768,913

CIGARETTE FILTER TIPS FROM DEXTRAN

Malvern J. Hiler, Dayton, Ohio, assignor to The Commonwealth Engineering Company of Ohio, Dayton, Ohio, a corporation of Ohio Application October 22, 1954, Serial No. 464,173

16 Claims. (Cl. 131—10)

This invention relates to novel filtering material and more particularly to a filter for cigarettes or for use in conjunction with cigars or pipes.

The constituents present in the effluent stream of smoke formed in the act of smoking comprise products of combustion including volatile products either formed or freed from the tobacco, such as ammonia, nicotine vapors, formic acid, furfuraldehyde, acrolein, and alkaloid bases of the pyridine type. Other products having their origin in humectants, insecticide residues, etc. may also be present as contaminants in the smoke. It is generally accepted that these impurities, or some of them, are harmful to individuals and various attempts have been made heretofore to clarify the smoke by use of filters made of or comprising such materials as cellulose in different physical form, inorganic substances of the type of granular silica gel, ion exchange resins, and so on. However, it is well known that no entirely satisfactory filter has been made available for purifying and clarifying the smoke and which, at the same time, is of such comparatively low cost that it does not add too much to the cost of the cigarette.

An object of this invention is to provide a new and improved relatively inexpensive filter for effectively clarifying the effluent stream of smoke.

Another object is to provide a new and improved filter to be associated with a cigarette as an integral element thereof which effectively removes, or substantially reduces, the amount of undesirable, possibly harmful constituents from the effluent stream of smoke without greatly increasing the overall cost of the cigarette.

These and other objects of the invention are accomplished by providing a new and novel filter comprising dextran or a dextran derivative, and having, preferably, a solid adsorbent such as activated charcoal, bentonite, diatomaceous earth, etc. in very fine divided form combined therewith.

The dextrans are obtained, usually, by inoculating an aqueous sucrose-bearing nutrient medium with a culture of an appropriate microorganism, such as those of the *Leuconostoc mesenteroides* and *L. dextranicum* types, or the enzyme filtered from the culture, incubating the mass until the dextran is biosynthesized in maximum yield, and separating the dextran from the fermentate. The dextran used in making the filter of this invention is one which is insoluble in water or substantially insoluble therein.

Microorganisms which synthesize a native dextran that is water-insoluble or substantially water-insoluble from sucrose include those bearing the following NRRL (Northern Regional Research Laboratory) designations: *Leuconostoc mesenteroides* B–523, B–1118, B–1120, B–1139, and B–1144. The dextran is used in the native, high molecular weight condition in which it is separated from the fermentate, after appropriate purification.

The invention will be more readily understood by reference to the accompanying drawing in which:

Figure 1 is a perspective view of a cigarette 1 comprising a filter member 2 composed of discrete particles of dextran; and Figure 2 is a perspective view of a cigarette similar to that of Figure 1, but comprising a filter member made of a crinkled paper 4 wrapped upon itself and having discrete particles of dextran fixed thereto and disposed between the convolutions thereof.

In a preferred form, the new filter comprises a mass of particles (flakes, granules, small pellets, tablets, etc.) of the water-insoluble dextran adhesively bonded together at contiguous surfaces and having spaces therebetween which define narrow passages that meander through the filter and along which the effluent stream of smoke is drawn so that it contacts the dextran aggregates or particles which absorb various constituents of the smoke and thereby clarify or purify it.

The filter may be obtained by mixing unplasticized particles of the dextran with suitably plasticized particles thereof, molding the plastic mass in the form of a rod of the appropriate small diameter and of indefinite length, and cutting the rod into the desired relatively short lengths. Thus, small aggregates of the water-insoluble dextran obtained with the use of a pelleting or tableting machine are intimately commingled with pellets of the dextran (of the same or different size and shape) that have been treated with a plasticizing agent, as for instance with an amount of aqueous sodium hydroxide, ammonium hydroxide or other volatile base sufficient to soften the dextran, and the resulting plastic mass is extrusion molded to obtain a cigarette filter tip consisting of a coherent mass of plasticizing alkaline dextran particles and acidic water-insoluble dextran particles which filter is particularly efficient for absorbing the smoke constituents due to its dual acidic and alkaline character. The plasticized or softened dextran particles or increments adhere to the remaining particles or increments, at points of contact of the particles or increments in the filter, whereby the increments are autogenously bonded together. The unplasticized and plasticized dextran aggregates or particles may be used in any suitable proportions such as 10% to 90% by weight of the one to 90% to 10% of the other, but in general are used in the proportions of 25% to 75% by weight unplasticized dextran to 25% to 75% by weight of the plasticized dextran.

Instead of plasticizing the dextran by treatment with an aqueous solution of sodium or ammonium hydroxide other volatile liquid bases which soften, plasticize or even partially solvate the dextran at ordinary temperature may be used, including liquid ammonia and the lower aliphatic amines such as methylamine, ethylamine, dimethylamine, etc.

The pellets of plasticized dextran may be obtained by mixing finely divided dextran with the plasticizing agent and then forming the mass into the pellets or aggregates of desired size and shape, and the commingling of those particles with the unplasticized dextran particles and subsequent molding of the mass may be performed so that, in the filter, the particles or a preponderant proportion thereof substantially retain their individual identity but are bonded or adhered together at points of contact leaving spaces which define the passages along which the stream of smoke is drawn.

The mass comprising the pellets or the like of plasticized dextran, and which is plastic and moldable due to the presence of those pellets, may be forced through a cylindrical extrusion device of the required comparatively small cross-section, and the rod emerging from the exit end of the device may be subjected to a current of warm air to dry it and set it in the molded condition before it is taken to a cutting apparatus and severed into the short lengths or plugs.

Prior to extruding the mass, for instance simultaneously with commingling of the particles of plasticized and unplasticized dextran, finely powdered activated charcoal or other inert adsorbent such as alumina, silica, etc., may be incorporated in any suitable amount such as 2% to 10% on the total dextran weight. The adsorbent remains distributed through the porous filter as an integral ingredient thereof and by adsorbing nicotine, tars and other undesirable constituents from the smoke stream, enhances the efficiency of the filter.

Instead of separately plasticizing a portion of the water-insoluble dextran and then forming the plasticized mass into pellets or the like for commingling with the particles of unplasticized dextran, a mass of water-insoluble dextran may be dampened with the plasticizing or softening agent and formed into pellets (optionally, but preferably, with prior incorporation of the finely powdered adsorbent) or the like which are then molded in the form of a rod in which the pellets are bonded together at contiguous surfaces and with spaces therebetween through which the effluent stream of smoke travels.

According to another embodiment, particles or grains of plasticized dextran and particles or grains of unplasticized dextran are sprayed onto a thin strip of backing material such as paper or cellophane, preferably finely crinkled, the plasticized dextran particles serving to anchor the particles of unplasticized dextran to the backing. The backing strip is then rolled on itself to define a plurality of generally parallel narrow passages along which the dextran grains (and particles of adsorbent interspersed therewith, if such are present) are distributed, a covering or wrapper, such as a paper or cellophane wrapper, being applied to define a general flow passage and compel the smoke to pass through the narrow passages defined by the portions of the grains projecting from the surface of the paper, which projecting portions act like baffles.

In the last-mentioned embodiment, instead of using particles of plasticized dextran as binder for the particles of unplasticized dextran, the latter may be deposited on the paper backing and sprayed with a liquid which plasticizes or softens the water-insoluble dextran, such as an aqueous solution of sodium hydroxide, ammonium hydroxide, a lower aliphatic amine or liquid ammonia, the liquid being used in an amount just sufficient to insure anchoring of the dextran particles to the paper. Or the dextran particles may be bonded to the paper with the aid of any binder or adhesive that may be used safely in a filter for the present purpose.

In another embodiment of the invention, the porous dextran filter is obtained by mixing the selected water-insoluble or substantially water-insoluble native dextran (optionally but preferably having the finely powdered adsorbent mixed therewith) with a volatile liquid which may soften or plasticize, without actually dissolving, the dextran at ordinary temperature but exerts a more pronounced solvating action on the dextran at somewhat elevated temperatures, and extruding the resulting mass through an elongated tubular extrusion device of the appropriate diameter with heating thereof to the temperature at which the liquid dissolves the dextran, to obtain a rod which, on emerging from the exit end of the extrusion device and as a result of the release of the pressure and removal of the solvent, develops fine interconnecting pores which persist in the rod after cooling thereof. Liquids which may be used in carrying out this modification include the lower aliphatic amines and liquid ammonia. The dextran, in flake or powder form may be mixed dry with the activated charcoal or the like and the latent solvent. Since the latter has no appreciable solubility for the dextran at ordinary temperatures, the dextran tends to remain as discrete particles or increments in the initial extrudable mass which is a discontinuous rather than a homogeneous mixture. At the elevated temperatures of 70° C. to 90° C. at which the mass is extruded and the liquid effects a more pronounced solvating effect on the dextran, a continuous mass is formed in which the dextran particles are welded together to form a kind of matrix in which, if particles of activated charcoal or other adsorbent are present, those particles are imbedded.

In any of the foregoing embodiments of the invention, the water-insoluble dextran may be replaced, in whole or in part, by any suitable water-insoluble dextran derivative such as dextran acetate or ethers of dextran such as methyl dextran and benzyl dextran.

The increments of water-insoluble dextran used to make the filter may have any desired shape and are small. The particles or increments may have a size such that they pass a 100-mesh screen but are retained on a 400-mesh screen.

The foregoing discussion concerns filters comprising water-insoluble dextran in non-fibrous form. Filters comprising water-insoluble dextran in fibrous form are also contemplated and within the purview of this invention. Filaments of the water-insoluble dextran obtained in any appropriate way, may be disrupted to obtain a mass of discontinuous fibers which may be formed into a thin web a strip of which may be wadded or rolled on itself and provided with a protective paper wrapper. One way of obtaining the water-insoluble dextran as discontinuous fibers comprises converting dextran to the water-insoluble xanthate by reaction with carbon disulfide (as described in the pending application of L. J. Novak et al., Ser. No. 414,862, filed March 8, 1954), dissolving the xanthate in aqueous sodium hydroxide to obtain a dope, spinning the dope through a spinneret into an aqueous sulfuric acid setting bath in which the dextran is regenerated in filament form, collecting the filaments as a tow, and putting the tow through a fiber cutter to obtain a mass of short fibers. These short fibers may be carded and/or combed to obtain a thin web into which the powdered activated charcoal or other adsorbent may be blown to provide myriad points of adsorption along the path of travel of the smoke when the web, in the form of a strip of appropriate width and length, is wrapped on itself or with intervening strips of paper, preferably finely crinkled paper, to obtain the filter for association with the cylinder of compacted tobacco. Instead of rolling the fibrous web with strips of paper it may be rolled with strips of metal foil, the foil having the effect of cooling the smoke before it is inhaled. Paper and metal foil may be used in alternate layers in making the filter comprising the web of dextran fibers.

In all of the embodiments described herein, the filter may be medicated or perfumed by the inclusion of, or by treatment with, the appropriate substances as for example menthol.

The filter element comprising the water-insoluble dextran or dextran derivative may be provided with a comparatively hard paper wrapper extending beyond the end of the filter away from the tobacco to provide a recess so that, in the case of a cigarette, even the filter member does not come in contact with the lips or teeth during smoking.

Instead of carding and/or combing the water-insoluble dextran fibers to obtain the fibrous web, the discontinuous fibers may be blown or otherwise deposited on a collecting surface and bonded together by spraying an aqueous solution of sodium hydroxide or other volatile base thereon, to obtain a thin web of heterogeneously arrayed fibers through which the smoke can be drawn and which, preferably after associating activated charcoal or other powdered adsorbent therewith, may be rolled or wadded to obtain the filter member. Mixtures of the water-insoluble dextran fibers with other fibers may also be used in forming the fibrous web.

The following examples are illustrative of certain specific embodiments of the invention, it being understood that these examples are not intended to be limitative.

Example I

Purified native *L. m* B-523 dextran in pellet form is commingled with 25% by weight of pellets of the purified native *L. m.* B-523 dextran plasticized with a 6% aqueous sodium hydroxide solution, all of the pellets being of substantially the same size. The mass of pellets is forced through a tubular extrusion device to obtain a rod having a diameter of ¼-inch. The dried rod in which the pellets are adhered together at points of contact to form a multiplicity of fine interconnecting pores or passages which meander through the rod from one end to the other thereof, is cut into short pieces each about ⅝-inch in length.

Example II

A filter is made as in Example I except that simultaneously with commingling of the plasticized and unplasticized pellets of water-insoluble dextran, 5% of pulverized activated charcoal is mixed into the mass.

Example III

Purified native *L. m.* B-523 dextran in granular form is mixed with methylamine to obtain a sprayable mixture which is then sprayed onto a sheet of crinkled paper and dried. The sheet is cut into narrow bands four of which are rolled up together to obtain a filter in which the dextran grains are disposed interiorly, the grains projecting from the paper surface defining passages for the smoke when the filter is associated in the usual way with a cylinder of compacted tobacco in the manufacture of a cigarette.

The filters of this invention, comprising water-insoluble dextran, effectively clarify an effluent stream of smoke drawn therethrough in the act of smoking by absorbing and adsorbing a high percentage of the foreign constituents of the smoke. The filters are more effective purifiers for the smoke than available filters and are comparatively low in cost.

While specific embodiments of the invention have been described, it will be understood that various changes and modifications may be made in details in practicing the invention without departing from the spirit and scope thereof and that, therefore, it is not intended to limit the invention except as defined in the appended claims.

What is claimed is:

1. A filter for clarifying an effluent stream of tobacco smoke and comprising a coherent mass of discrete particles of a substance selected from the group consisting of substantially water-insoluble dextrans and dextran derivatives, at least some of the particles being plasticized and particles of the mass being bonded together at contiguous surfaces and having spaces therebetween defining passages that meander through the filter and along which the effluent stream of smoke passes in contact with the particles.

2. A cigarette comprising, as an integral element thereof, a filter for clarigying the effluent stream of smoke formed during smoking of the cigarette, said filter comprising a coherent mass of discrete particles of a substance selected from the group consisting of substantially water-insoluble dextrans and dextran derivatives, at least some of the particles being plasticized and particles of the mass being bonded together at contiguous surfaces and having spaces therebetween defining passages that meander through the filter and along which the effluent stream of smoke passes in contact with the particles.

3. A filter for clarifying an effluent stream of tobacco smoke and comprising a coherent mass of discrete particles of a substance selected from the group consisting of substantially water-insoluble dextrans and dextran derivatives, having mixed therewith a finely divided inert adsorbent, at least some of said particles being plasticized and particles of the mass being bonded together at contiguous surfaces and having spaces therebetween defining passages that meander through the filter and along which the effluent stream of smoke passes in contact with the particles.

4. A filter for clarifying a effluent stream of tobacco smoke and comprising a coherent mass of discrete particles of a substance selected from the group consisting of substantially water-insoluble dextrans and dextran derivatives having activated charcoal mixed therewith, at least some of said particles being plasticized and particles of the mass being bonded together at contiguous surfaces and having spaces therebetween defining passages that meander through the filter and along which the effluent stream of smoke passes in contact with the particles.

5. A cigarette comprising, as an integral element thereof, a filter for clarifying the effluent stream of smoke formed during smoking of the cigarette, the filter comprising a coherent mass of discrete particles of a substance selected from the group consisting of substantially water-insoluble dextrans and dextran derivatives having a finely divided inert adsorbent mixed therewith, at least some of said particles of the mass being bonded together at contiguous surfaces and having spaces therebetween defining passages that meander through the filter and along which the effluent stream of smoke passes in contact with the particles.

6. A filter for clarifying an effluent stream of smoke formed during smoking of tobacco and comprising a firm, relatively short, generally cylindrical coherent mass of discrete particles of substantially water-insoluble dextran at least some of said particles being plasticized and particles of the mass being bonded together at contiguous surfaces to define fine, interconnecting pores that are distributed through the mass and provide passages through the filter for the stream of smoke.

7. A cigarette having associated therewith, as an integral element thereof, a filter comprising a firm, relatively short, generally cylindrical mass of coherent discrete particles of substantially water-insoluble dextran at least some of said particles being plasticized and particles of the mass being bonded together at contiguous surfaces to define fine, interconnecting pores distributed through the mass and providing passages through the filter for the stream of smoke.

8. A cigarette having associated therewith, as an integral element thereof, a filter comprising a firm, relatively short, generally cylindrical coherent mass of discrete particles of substantially water-insoluble dextran having a finely divided inert adsorbent mixed therewith, at least some of the water-insoluble dextran particles being plasticized and particles of the mass being bonded together at contiguous surfaces to define fine, interconnecting pores distributed through the mass and providing passages for the effluent stream of smoke formed during smoking of the cigarette.

9. A cigarette having associated therewith, as an integral element thereof, a filter comprising a firm, relatively short, generally cylindrical coherent mass of discrete particles of substantially water-insoluble dextran having powdered activated charcoal mixed therewith, at least some of the water-insoluble dextran particles being plasticized and particles of the mass being bonded together at contiguous surfaces to define fine, interconnecting pores distributed through the mass and providing passages for the effluent stream of smoke formed during smoking of the cigarette.

10. A filter for clarifying an effluent stream of smoke formed during smoking of tobacco and comprising a strip of crinkled paper having adhered thereto, at all portions of a surface thereof but in spaced relation and projecting from the surface, small increments of substantially water-insoluble plasticized dextran, the strip being tightly rolled on itself to form a relatively short, generally cylindrical filter member having the dextran increments disposed interiorly thereof, the spaces between the portions of said increments projecting from the surface of the paper constituting passages through the member for the stream of smoke.

11. A cigarette having associated therewith, as an integral element thereof, a filter comprising a strip of crinkled paper having a multiplicity of small increments of substantially water-insoluble plasticized dextran adhered, in spaced relation, to a surface thereof and projecting from the surface, the strip being tightly rolled on itself to form a relatively short, generally cylindrical filter member having the dextran increments disposed interiorly thereof, the spaces between the portions of the increments projecting from the paper surface constituting passage through the member for the effluent stream of smoke formed during smoking of the cigarette.

12. A cigarette having associated therewith, as an integral element thereof, a filter comprising a strip of crinkled paper having a mixture of small increments of substantially water-insoluble plasticized dextran and fine particles of inert adsorbent adhered to a surface thereof, in spaced relation, and projecting from the surface thereof, the strip being tightly rolled on itself to form a relatively short, generally cylindrical filter member having the dextran increments and inert adsorbent particles disposed interiorly thereof, the spaces between the portions of the dextran increments and inert adsorbent particles projecting from the paper surface constituting passages through the filter member for the efflulent stream of smoke formed during smoking of the cigarette.

13. A cigarette having associated therewith, as an integral element thereof, a filter comprising a strip of crinkled paper having a mixture of small increments of substantially water-insoluble plasticized dextran and fine particles of activated charcoal adhered to a surface thereof in closely packed but spaced relation and projecting from the surface, the strip being tightly rolled on itself to form a relatively short, generally cylindrical filter member having the dextran increments and charcoal particles disposed interiorly thereof, the spaces between the portions of the dextran increments and charcoal particles projecting from the paper surface constituting passages through the member for the effluent stream of smoke formed during smoking of the cigarette.

14. A filter for clarifying an effluent stream of tobacco smoke and comprising a mass of increments of substantially water-insoluble dextran of predetermined shape and small size, at least some of the increments in the mass being plasticized and said increments being bonded together at their points of contact in the filter.

15. A cigarette comprising, as an integral element thereof, a filter for clarifying the effluent stream of smoke formed during smoking of the cigarette, said filter comprising a mass of increments of substantially water-insoluble dextran of predetermined shape and small size, increments in the mass being plasticized and being bonded together at their points of contact in the mass.

16. A cigarette comprising, as an integral element thereof, a filter for clarifying the effluent stream of smoke formed during smoking of the cigarette, said filter comprising substantially water-insoluble, unplasticized dextran in the form of increments of predetermined shape and small size and substantially water-insoluble plasticized dextran in the form of increments of predetermined shape and small size, plasticized dextran increments in the filter serving as binder for unplasticized dextran increments therein.

References Cited in the file of this patent

UNITED STATES PATENTS

| 2,674,517 | Deniston | Apr. 6, 1954 |
| 2,702,231 | Deniston | Feb. 15, 1955 |

FOREIGN PATENTS

| 30,668 | Holland | Aug. 16, 1933 |
| 189,399 | Switzerland | May 1, 1937 |
| 665,278 | Great Britain | Jan. 23, 1952 |